United States Patent [19]

Press et al.

[11] 3,811,649
[45] May 21, 1974

[54] CONSTRICTABLE TUBE VALVE WITH PLURAL WALL TUBE

[75] Inventors: Irving D. Press, West Orange; Helm A. Rink, North Haledon; John K. Menzel, Orange, all of N.J.

[73] Assignee: Resistoflex Corporation, Roseland, N.J.

[22] Filed: July 20, 1972

[21] Appl. No.: 273,388

[52] U.S. Cl. .................................. 251/8, 251/331
[51] Int. Cl. .............................................. F16k 7/06
[58] Field of Search ............................... 251/4–10; 277/53

[56] References Cited
UNITED STATES PATENTS

| | | | |
|---|---|---|---|
| 2,467,150 | 4/1949 | Nordell | 251/5 X |
| 2,735,642 | 2/1956 | Norman | 251/5 |
| 2,994,337 | 8/1961 | Freeman | 251/8 X |
| 3,482,267 | 12/1969 | Liljendahl | 251/5 X |

FOREIGN PATENTS OR APPLICATIONS

| | | | |
|---|---|---|---|
| 1,040,349 | 8/1966 | Great Britain | 251/5 |
| 1,086,956 | 8/1960 | Germany | 251/7 |

*Primary Examiner*—Alan Cohan
*Assistant Examiner*—Richard Gerard
*Attorney, Agent, or Firm*—Watson Leavenworth Kelton & Taggart

[57] ABSTRACT

The tube of a constrictable tube valve is formed with a plural wall of which the outermost wall is shorter than the innermost wall. A metal housing with internal surfaces of varying perimeter or girth closely fits around the separate walls with the innermost wall extending outside the housing where it is radially flared over the faces of flanges on the housing. A plurality of connecting elements pass through the outermost wall of the tube and connect with the innermost wall. The free ends of the connecting elements are coupled to one or the other of two compressor members which exert closing pressure upon the tube. A separate metal fork having its tines inserted in a corresponding base on the innermost tube wall serves to anchor the respective connecting element thereto.

16 Claims, 11 Drawing Figures

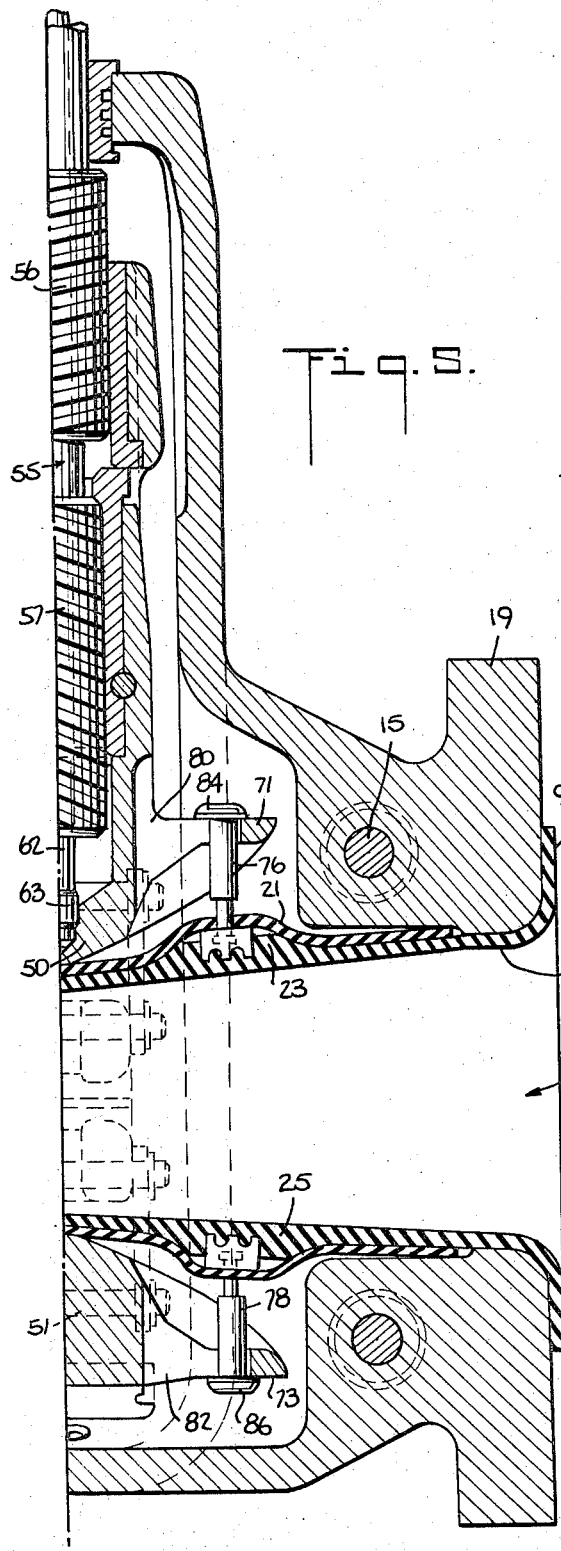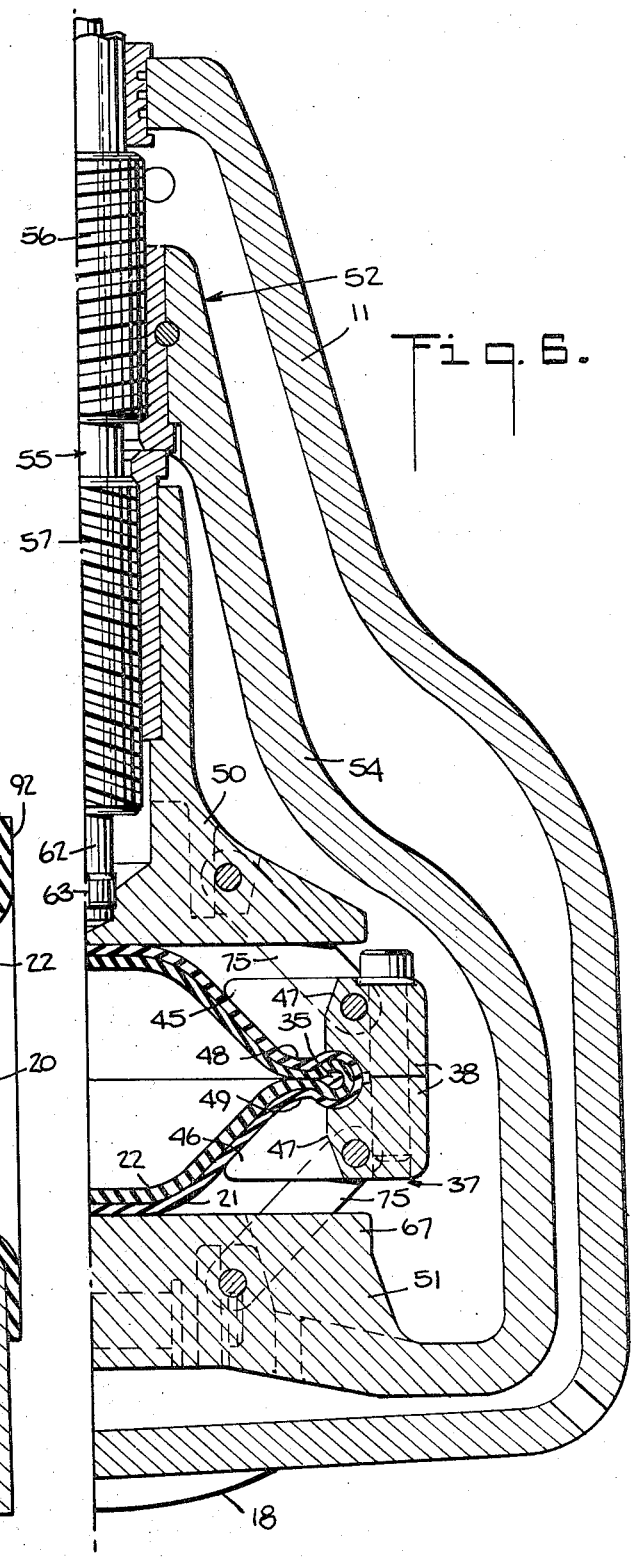

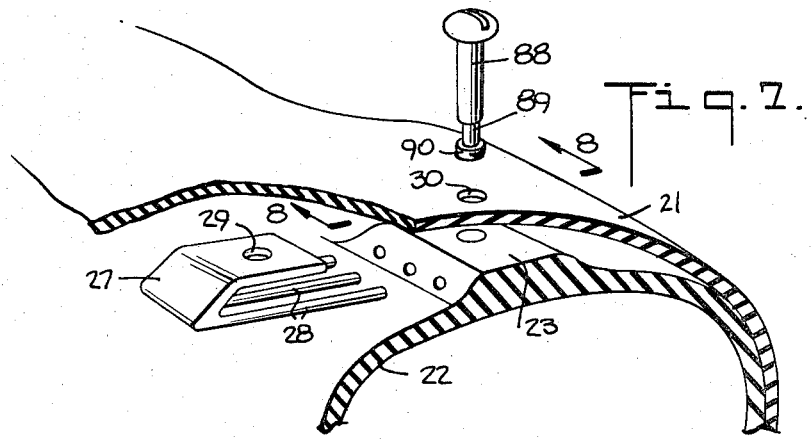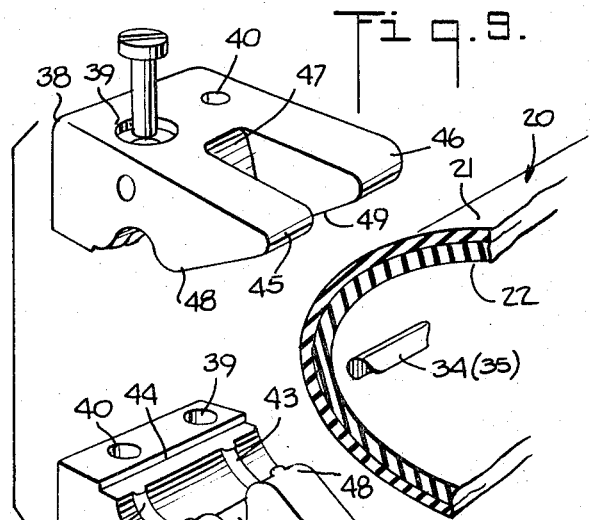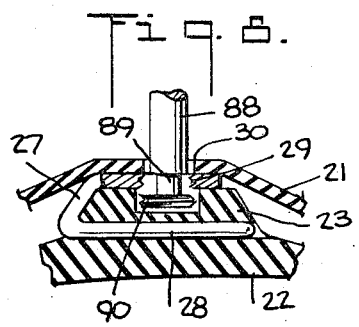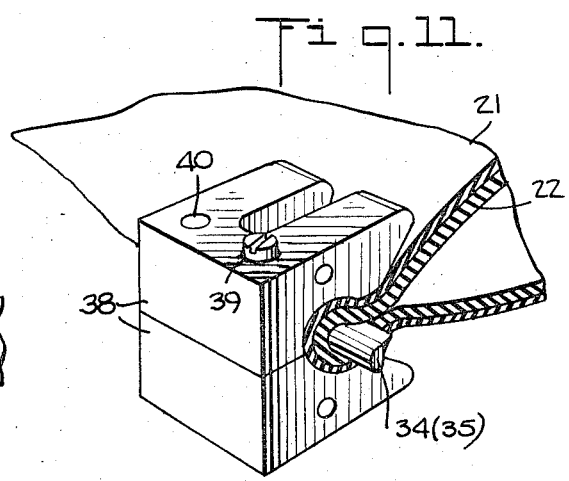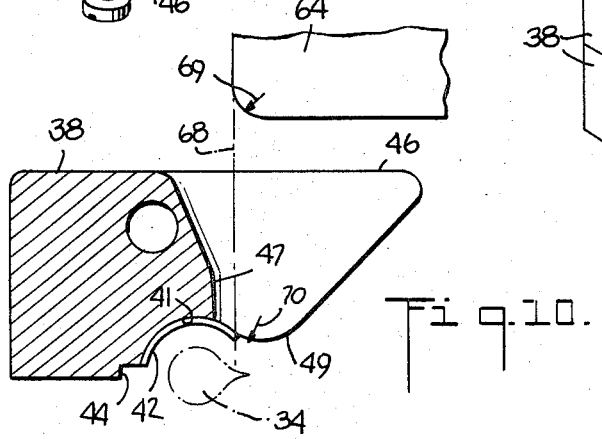

CONSTRICTABLE TUBE VALVE WITH PLURAL WALL TUBE

The present invention relates to fluid valves and, more particularly, to a valve of the type in which a constrictable tube is mechanically flattened to form a barrier to the flow of fluid material therethrough.

In copending U.S. Pat. application Ser. No. 126,436 filed Mar. 22, 1971, and now U.S. Pat. No. 3,733,046 for "CONSTRICTABLE TUBE VALVE," and assigned to the same assignee as the present application, there is described and claimed a constrictable valve of the foreoing type. As explained in said copending application, clamps are disposed at opposite edges of the tube to maintain regions at each edge of the tube in constantly constricted fluid sealing condition free from crack inducing flexure. In the preferred embodiment, the sidewall of the tube is secured in sealing embrace about a smoothly curving filler piece. Closure of the valve is accomplished by means of a pair of compressor members for constricting the tube between the edge clamps.

An improved constrictable valve of the foregoing type is described and claimed in copending U.S. Pat. application Ser. No. 162,407 filed July 14, 1971, for "A POSITIVE OPENING AND CLOSING CONSTRICTABLE TUBE VALVE WITH MEANS FOR PROLONGING TUBE LIFE," and assigned to the same assignee as the present application. As explained in said last mentioned copending application, notched edge clamps cooperate with lateral extensions on the compressor members for ensuring sealing while the clamps have smoothly rounded diverging mouths for preventing crack inducing flexure of the tube. A limber wishbone shaped yoke maintains sealing pressure in the face of cold flow of the material in the constrictable tube. Wings on the compressor members with transition curves provide for a gradual transition avoiding distension or overstressing of the tube during flexure. Connections with lost motion between bosses on the tube and respective wings provide positive opening in the face of negative or low positive pressure.

Although as mentioned in both of the aforesaid applications, the constrictable tube need not be monolithic, both applications describe in detail only valves with monolithic constrictable tubes. In the application first mentioned above it is suggested that the tube of flexible material may be reinforced with one or more layers of reinforcing material. In the second mentioned application the tube and bosses are formed by extruding a tube with longitudinal ribs and then machining away the undesired sections of the ribs.

With the foregoing in mind, the present invention seeks to provide a constrictable tube valve having increased pressure handling capability without sacrificing operating life.

In accordance with one aspect of the present invention there is provided a valve of the type wherein a tube of flexible material is flattened to form a barrier to the flow of fluid material therethrough, comprising in combination a plural-wall tube of flexible plastic, a pair of compressor members for adjustably constricting the tube transversely thereof, a plurality of connecting elements passing through the outer walls of the tube and secured to the innermost wall thereof, and means coupling the elements to the compressor members for effecting positive expansion of the tube when the compressor members are moved apart. As will be explained more fully hereinafter, at least the innermost tube wall is longer than the other tube walls and the tube and compressor members are closely surrounded by a rigid housing having end flanges surrounding opposite ends of the tube with the longer tube walls extending out of the housing where they are flared radially outwardly over the respective faces of the end flanges.

The many objects and advantages of the present invention will be apparent to those skilled in the art after reading the following detailed description of the presently preferred embodiment of the invention with reference to the accompanying drawing in which:

FIG. 5 is a partial view similar to FIG. 3 showing the valve in open condition;

FIG. 6 is a partial sectional view similar to FIG. 4 but showing the valve in open condition;

FIG. 7 is an exploded fragmentary view showing the components which make up a connecting element connected to the tube;

FIG. 8 is a fragmentary sectional view taken along the line 8—8 in FIG. 7;

FIG. 9 is a fragmentary exploded view showing the two halves of an edge clamp as employed in the present embodiment;

FIG. 10 is a fragmentary sectional view taken along the line 10—10 in FIG. 2 but with the parts displaced and drawn to an enlarged scale for clarity; and FIG. 11 is a fragmentary perspective view showing the relationship between edge clamp, filler piece and constrictable tube.

The same reference numerals are used throughout the drawings to designate the same or similar parts.

Figure 1:
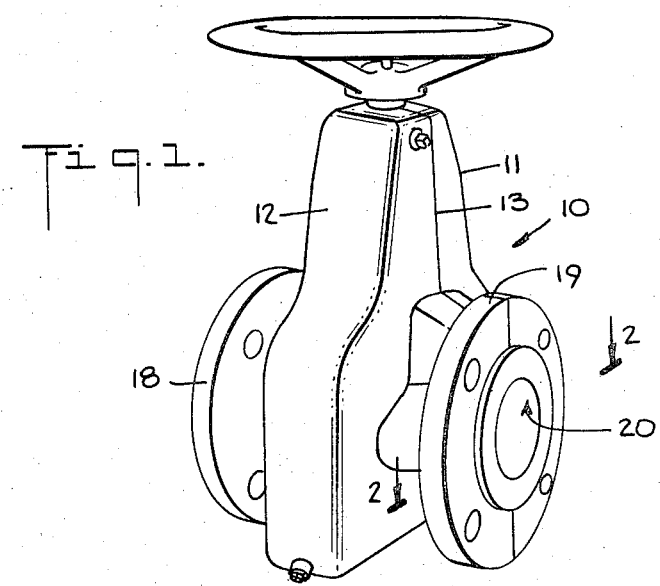
FIG. 1 is a perspective view of a constrictable tube valve embodying the present invention.

Referring now to the drawings, the valve housing is shown generally at 10, consisting of two identical halves 11 and 12 joined along the longitudinal line 13 by the bolts 14, 15, 16 and 17. When assembled, the housing has end flanges 18 and 19. A constrictable tube 20, in this example of double-wall construction, is shown consisting of an outer wall 21 and an inner wall 22 disposed between the end flanges 18 and 19 with the ends of the inner wall 22 flared over the faces of said flanges. While the tube 20 may be made of other materials and of more than two layers, it is in this example formed from two monolithic layers of polytetrafluoroethylene resin (P.T.F.E.). Suitable P.T.F.E. tubes may be produced employing the method set forth in U.S. Pat. No. 2,752,637 issued July 3, 1956, and assigned to the same assignee as the present application.

The outer surface of the inner tubular element 22 has two bosses 23 and 24 (best seen in FIG. 3) spaced apart along a longitudinal element on one side of the tubular element and two further bosses 25 and 26 similarly spaced along a longitudinal element on the diametrically opposite side of the tubular element such that pairs of said bosses are in substantially diametrical opposition. The bosses may be formed on the tubular element 22 by the method described more fully in the aforesaid copending U.S. Pat. application Ser. No. 162,407. Each of the bosses 23 to 26 is provided with an individual anchor means joined thereto as best seen in FIGS. 7 and 8. The anchor means is in the form of a metal fork 27, having its tines 28 inserted transversely into a side of the boss as clearly shown in FIG. 8. The body section of the fork 27 is curved back on itself to overlie the surface of the corresponding boss and is provided with a tapped aperture 29. The fork 27 may be stamped and formed from sheet stock or produced by casting or other suitable techniques in known manner.

With the fork element 27 in place, the outer tubular element or wall 21 is assembled thereto in snugly interfitting concentric relationship. Corresponding apertures 30, 31, 32 and 33 are formed in the wall of the outer tubular element 21 overlying each of the bosses 23, 24, 25 and 26 for providing access to the respective anchor means therebelow.

Figure 4:
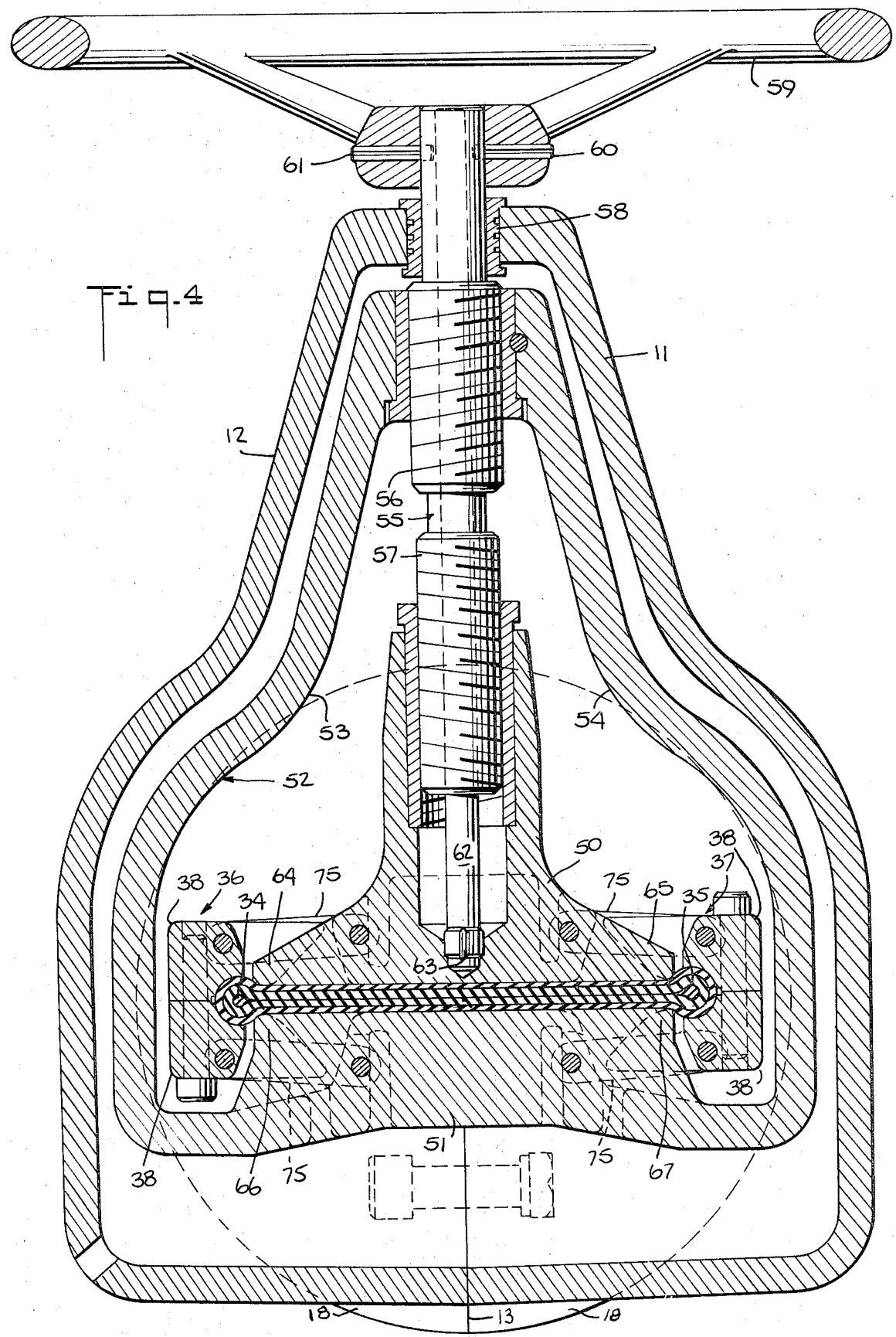
FIG. 4 is a transverse sectional view taken along the line 4—4 in FIG. 3 with the valve closed.

Disposed at opposite edges of the tube 20, on the interior thereof, are filler pieces 34 and 35, best seen in FIGS. 4, 9 and 11. These pieces must be fluid impervious elements. The filler piece should have a smoothly curving contour to which the tube may be conformed by wrapping therearound without inducing a crack in the tube walls. As described in the aforesaid copending U.S. Pat. application Ser. No. 126,436, the filler piece preferably is in the form of a cylinder with a directrix of substantially tear-drop shape such that the piece has substantially a featheredge at the point where the tube wall comes together. It is generally trapezoidal in outline and is installed in the tube such that when the tube is wrapped around the filler piece the featheredge faces radially inwardly of the tube. The filler piece is preferably produced from sintered P.T.F.E. resin fabricated by any known method.

To permanently constrain the side edge of the tube around the filler piece, there are provided the clamping devices 36 and 37. These clamping devices 36 and 37 may be made up of identical halves 38, which, when secured together, form two substantially C-shape assemblies with the side edge of the tube being confined by the jaws of the C-shape assembly in sealing engagement with the filler piece. As best seen in FIG. 9, the clamp members 38 are provided with a counterbored through bore 39 and a tapped bore 40 on opposite sides thereof. Thus, when two of the members 38 are clamped together, face-to-face, the bore 39 in one member will receive a bolt which will thread into the threaded bore 40 in the mating member and vice versa.

Referring to both FIGS. 9 and 10, it will be observed that the edge clamp member 38 is provided with a cylindrical contour at 41 for embracing the tube wall. Arcuate ribs 42 and 43 are located in the cylindrical jaw region 41, as shown, for developing localized pressure on the tube. A rabbett is provied at 44 in order to provide a gap as two of the members 38 are being brought together about the tube edge for avoiding pinching of the material of the tube between the members. As disclosed in the aforesaid copending U.S. Pat. application Ser. No. 162,407, the members 38 herein are provided with spaced parallel fingers 45 and 46 separated by the notch 47. In addition, the members 38 each have a smoothly rounded diverging mouth which when installed upon the tube faces the axis thereof, such mouth being provided by the surfaces 48 and 49 on the fingers 45 and 46, respectively. For the purpose of providing greater back-up support for the tube, the surfaces 48 and 49 of the clamps in the present application have been lengthened and straightened by comparison with the related surfaces on the clamps described in said U.S. Pat. application Ser. No. 162,407. As described in the last mentioned application, the purpose of the rounded diverging surfaces or mouth of the edge clamp members is to prevent crack inducing flexure of the tube during opening and closing of the valve. The cooperation of the rounded surfaces of the clamps with the sides of the tube wall can best be seen in FIG. 6 which shows the relationship of the parts with the valve in open position.

The valve includes a pair of compressor members 50 and 51 for adjustably constricting the remainder of the tube 20 between the clamps 36 and 37 for controlling the closing of the valve. As best seen in FIG. 4, the compressor member 51 is formed integral with a yoke 52. The yoke 52 is generally wishbone shape with the arms 53 and 54 following mirror symmetric S-curves. Valve manipulating means in the form of a threaded stem 55 having reversely threaded portions 56 and 57 is coupled to the yoke where the arms 53 and 54 converge. The coupling is accomplished through threaded engagement of the threaded portion 56 of the stem 55 with a threaded bore, here provided in a bushing, at the top of the yoke 52.

The threaded portion 57 of the stem 55 is threadedly engaged in a threaded bore or bushing in the compressor member 50. The upper end of the stem 55 passes through a special grommet 58 at the top of the housing 10. A suitable handwheel 59 may be secured to the top of the stem 55 with suitable shear pins 60 and 61, or other appropriate means.

The threaded sections 56 and 57 of the valve stem are oppositely threaded such that as the handwheel 59 is rotated in the clockwise direction as viewed from above, the valve will be closed by causing the yoke 52 to advance upward toward the top of the housing while causing the compressor 50 to travel down the stem. When the handwheel 59 is manipulated in the reverse direction the valve will open through reverse operation of the component parts.

A rod 62 passng through a longitudinal bore through the valve stem 55 and fastened at its lower end 63 by any suitable means to the compressor member 50 functions as an indicator to show the condition of the valve. Thus, it will be observed from FIG. 4 that the indicator rod 62 is completely recessed in the stem 55 with the valve fully closed. When the valve is opened the indicator rod 62 will advance upwardly through the valve stem 55 causing its upper end to project therefrom as a visible indication of the valve open condition.

Figure 2:
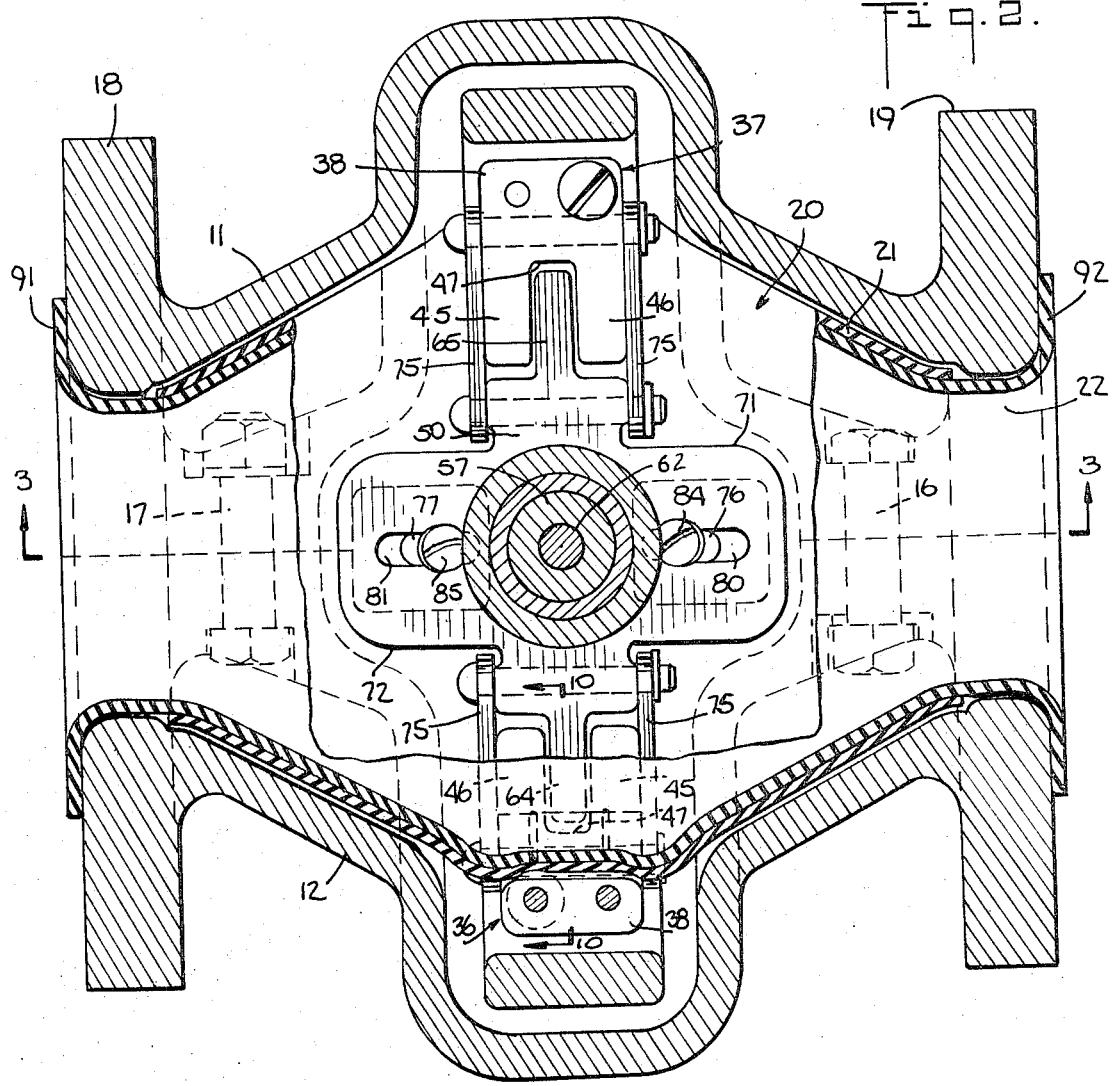
FIG. 2 is a horizontal sectional view taken along the line 2—2 in FIG. 1 with the valve closed.

In order to ensure complete edge-to-edge sealing of the valve upon its closure, particularly in view of the gradually curving surfaces 48 and 49 of the edge clamps, the compressor members 50 and 51 are arranged to extend across the tube in overlapping relationship with respect to the corresponding edge clamps. As best seen in FIGS. 2, 4 and 10, the compressor members 50 and 51 each have a narrow lateral extension shown at 64, 65, 66 and 67 on opposite ends reaching laterally relative to the tube into the space between the corresponding fingers 45 and 46 of a corresponding edge clamp member 38. In the present embodiment, the lateral extensions 64 to 67 are appreciably longer than those employed in the valve described in the above second mentioned copending application. This change is necessary to accommodate the increased support surface provided by the edge clamps as mentioned previously.

The cooperation when the valve is closed between the lateral extensions of the compressor members, the edge clamps and the clamped edges of the tube 20 can best be seen in FIG. 10. Only the end 64 of compressor member 50 is shown as exemplary relative to one of the clamps 38 with the filler piece 34 shown in phantom lines. While it is intended to show the relationship with the valve closed, for clarity the compressor member 50 has been shown displaced vertically with its edge following the phantom line 68. The normal inward movement of the edge clamp has been ignored so that the clamp appears in its closed valve position.

Notice should be had of the curved surfaces designated by the radii 69 and 70. The radius 69 may be slightly less than radius 70 while the two surfaces substantially coincide when the valve is closed. Allowing for the thickness of the walls 21 and 22 of the tube 20, it will be seen that the end of the compressor member reaches laterally relative to the tube substantially up to a point overlying the proximal portion of the filler piece with the surface 69 engaging the tube wall to compress it against the concave surface of the filler piece. The finger 46 typically straddles the extension 64 extending radially inwardly of the tube beyond said point applying sealing pressure at least to a point inwardly or overlapping the point where the compressor member leaves off. This overlapping relationship ensures that there is no path through the valve for leakage when the valve is intended to be closed. The illustrated relationship is typical being the same for all of the edge clamp fingers and compressor extensions. It should also be understood that the spacing or clearance between the walls of the notch in the edge clamp member and the extension of the compressor, in the valve closed position, is not critical.

It should be apparent from a consideration of the valve structure that the constrictable tube 20 must repeatedly accommodate itself during the manipulation of the valve to a transition from the cylindrical end portions to the flattened central region. It is important that distension or overstressing of the tube wall be avoided if the valve is to have appreciable cycling life. Therefore, as explained in the above second mentioned copending application, the compressor members 50 and 51 include the wings 71, 72, 73 and 74 extending longitudinally of the valve and presenting a smooth curving surface for engaging the wall of the tube 20 to back it up and ensure a gradual transition between the normally circular ends of the tube and the constricted portion when the valve is subjected to fluid pressure.

Rotation of the compressor members 50 and 51 relative to the tube 20 is avoided by interconnecting the compressor members with the edge clamp members 38 through the links 75. The links 75 should be freely articulatable and may even be slotted at their ends to provide some lost motion.

Figure 3:
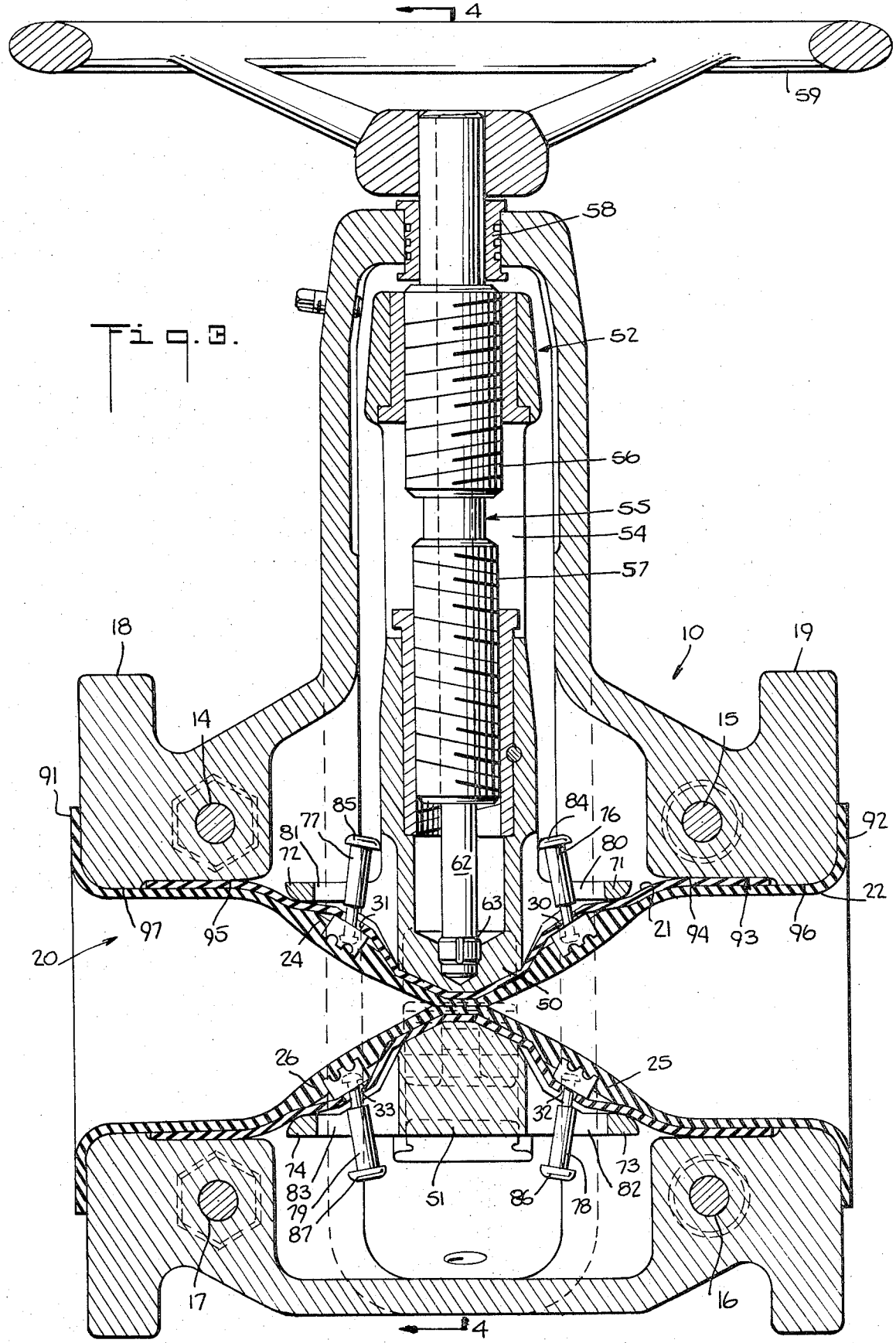
FIG. 3 is a vertical sectional view taken along the line 3—3 in FIG. 2 with the valve closed.

In order to ensure opening of the valve when internal fluid pressure is inadequate, means are provided joining the inner tube 22 to the wings 71, 72, 73 and 74. As best seen in FIG. 3, this means takes the form of a plurality of interconnecting members 76, 77, 78 and 79 secured at one end to the tube 22 and coupled at their other ends each to a different one of the wings 71 through 74, respectively. As seen in the drawings, the wings are provided with slots 80, 81, 82 and 83 through which the interconnecting members 76 to 79 pass. The interconnecting members are in the form of modified screws having heads 84, 85, 86 and 87 which function as retaining means engaging the corresponding wings. It will be observed that the interconnecting members 76, 77, 78 and 79 are secured to the tube 22 in pairs in substantially diametrical opposition at locations spaced longitudinally from the region contacted by the compressor members 50 and 51. By comparing FIG. 3 with FIG. 5, it will be observed that the interconnection between the tube 22 and the corresponding wings 71 through 74 is characterized by lost motion.

For the purpose of securing the interconnecting members to the tube 22, the tube is provided with the bosses 23 through 26, described previously. All of the interconnecting mmbers 76, 77, 78 and 79 may be identical. A typical assembly is illustrated in FIGS. 7 and 8, wherein the member is shown as consisting of a screw 88 with a reduced diameter region 89 near its end 90. As best seen in FIG. 8, the lead end of the screw 88 which retains its threads is passed through the aperture 30 in the outer tube wall 21 and threaded through the tapped aperture 29 in the fork anchor 27 until the section 89 coincides with the tapped aperture 29. By this arrangement, the screw 88 is captured by the anchor 27 with some play allowed therebetween so that the screw 88 is free to articulate relative to the boss 23. It is to be understood that various other arrangements may be employed for interconnecting the tube wall with the corresponding compressor member, one other arrangement having been described in the second mentioned copending application referred to above. The arrangement illustrated herein is intended merely as a further example.

As best seen in FIG. 3, the tube 20 and compressor members 50 and 51 are closely surrounded by the rigid housing 10. The end flanges 18 and 19 of said housing surround opposite ends of the tube 20. The outer wall 21 of the tube 20 is shorter than the inner wall 22 of the tube 20 and terminates inwardly of the faces of the end flanges 18 and 19. The inner wall 22 of the tube 20 extends out of the housing 10 where it is flared radially outwardly over the respective faces of the end flanges at 91 and 92. The housing 10 has an inner wall of varying perimeter or girth. As seen in FIG. 3, the perimeter is greater in the regions 94 and 95 and less in the regions 96 and 97. In this manner, the wall 93 of the housing closely surrounds the inner tube wall 22 beyond the termination of the outer tube wall 21 and closely surrounds the outer tube wall 21 at its respective ends.

By making the tube 20 from a plurality of tubular elements, e.g., the two elements 21 and 22, it has been found possible to increase the pressure handling capability of the tube 20 without increasing the crack sensitivity of the material nor reducing the flex life thereof. At the same time, by terminating the outer tube short of the flange face of the metal housing it has been possible to retain an optimum thickness of material over the face of the flange to perform the necessary sealing function when the valve is installed in a line. It should be observed that the interior of the housing has been carefully configured to cooperate with the compressor elements to provide minimum clearance therebetween so that the flexible tube wall is closely surrounded at all times over a maximum portion of its area. This is important to prevent a localized area of the tube from blowing out under internal fluid pressure when in use.

Although the invention has been described with reference to a double-wall tube embodiment, it is to be understood that additional tube walls can be added to increase the strength of the tube structure without introducing undue stiffness. Where more than two walls are employed the radially innermost should be long enough to extend outside of the valve housing similar to tube wall 22, while the outermost should be short similar to the tube wall 21. The intermediate tube walls may all be short similar to the outemost, or one or more tube walls adjacent the innermost may be as long as the latter so as to extend outside of the housing. However, in the latter case the plural thickness in the flared region may be disadvantageous.

The grommet 58 serves a multiple purpose. It is preferably formed from P.T.F.E. and made somewhat resilient through the incorporation of the series of circumferential grooves located around its outer surface. When the valve is closed fluid pressure within the tube 20 exerts a thrust on the entire actuator assembly tending to urge the valve stem 55 in the downstream direction relative to the housing 10. The grommet 58 has sufficient resiliency due to the grooves in its outer surface to accommodate such thrust without binding on the valve stem 55.

Another function of the grommet 58 is to seal the housing against gross egress of fluid if the tube 20 should fail.

A further function of the grommet is to serve as a thrust bearing for the handwheel 59 when the valve is upright and for the shoulder on the valve stem 55 when the valve is disposed in inverted position. It must be remembered that it is only the stiffness of the tube 20 which resists the weight of the operating mechanism.

Valves constructed in accordance with the present invention have been conservatively rated at 150 psi at 350° F (or 225 psi at 70° F) with a full 4 to 1 safety factor, even at maximum operating temperature. Such valves are capable of at least 10,000 operating cycles (open-close-open) under maximum operating conditions before possible failure.

Having described the presently preferred embodiment of the invention, it should be understood that various changes in construction may be made without departing from the true spirit of the invention as defined in the appended claims.

What is claimed is:

1. A valve of the type wherein a tube of flexible material is flattened to form a barrier to the flow of fluid material therethrough, comprising in combination a plural-wall tube of flexible material, a pair of compressor members for adjustably constricting said tube transversely thereof, a plurality of connecting elements passing through the outer walls of said tube and secured to the innermost wall thereof, and means coupling said elements to said compressor members for effecting positive expansion of said tube when the compressor members are moved apart.

2. A valve according to claim 1, wherein said tube and compressor members are closely surrounded by a rigid housing having end flanges surrounding opposite ends of said tube, the outermost wall of said tube being shorter than the innermost wall of said tube and terminating inwardly of the faces of said end flanges while the innermost wall of said tube extends out of said housing where it is flared radially outwardly over the respective faces of said end flanges.

3. A valve according to claim 2, wherein said housing has an inner wall of varying perimeter for closely surrounding said innermost tube wall beyond the termination of said outermost tube wall and for closely surrounding said outermost tube wall at its respective ends.

4. A valve according to claim 1, wherein a pair of edge clamps are disposed at opposite sides of said tube securing opposite edges of said tube in substantially permanent folded fluid sealing embrace, said tube being folded around a smoothly contoured filler piece within each edge clamp, and said compressor members extend across said tube in overlapping relationship with respect to said edge clamps to ensure complete edge-to-edge sealing upon closure of said valve.

5. A valve according to claim 1, wherein the outer surface of said innermost wall of said tube is formed with a pair of bosses located longitudinally spaced from the region which is flattened on one side thereof in substantially diametral opposition, and wherein means are provided joining one end of each of a pair of said connecting elements to a corresponding one of said bosses, and said means coupling said elements to said compressor members includes means joining the opposite ends of said pair of elements articulately to the adjacent compressor member.

6. A valve according to claim 5, wherein the means joining the end of said element to a boss comprises a metal fork anchor having its tines inserted transversely into a side of the boss and a body section curved back upon itself to overlie the surface of the boss and to secure the end of the connecting element.

7. A valve according to claim 5, wherein said inner wall of the tube is provided with a second pair of bosses located longitudinally spaced from said region which is flattened on the other side from said first pair and in substantially the same diametral opposition, said second pair of bosses being coupled to the opposite side of said corresponding adjacent compressor members by a separate pair of said connecting elements in a similar manner to said first pair.

8. A valve according to claim 7, wherein the means joining the ends of said elements to each of said bosses comprises a respective metal fork anchor having its tines inserted transversely into a side of the corresponding boss and a body section curved back upon itself to overlie the surface of the corresponding boss and secure the end of the respective connecting element.

9. A valve according to claim 7, wherein said tube and compressor members are closely surrounded by a rigid housing having end flanges surrounding opposite ends of said tube, the outermost wall of said tube being shorter than the innermost wall of said tube and terminating inwardly of the faces of said end flanges while the innermost wall of said tube extends out of said housing where it is flared radially outwardly over the respective faces of said end flanges.

10. A valve according to claim 9, wherein said housing has an inner wall of varying perimeter for closely surrounding said innermost tube wall beyond the termination of said outermost tube wall and for closely surrounding said outermost tube wall at its respective ends.

11. A valve according to claim 10, wherein the means joining the ends of said elements to each of said bosses comprises a respective metal fork anchor having its tines inserted transversely into a side of the corresponding boss and a body section curved back upon itself to overlie the surface of the corresponding boss and secure the end of the respective connecting element.

12. A valve according to claim 1, wherein the walls of said tube are provided by two concentric snugly interfitted tubular elements of polytetrafluoroethylene resin.

13. A valve according to claim 12, wherein said connecting elements pass loosely through apertures in said outermost tubular element.

14. A valve according to claim 13, wherein said tubular elements and compressor members are closely surrounded by a rigid housing having end flanges surrounding opposite ends of said tube, the outermost tubular element being shorter than the innermost tubular element and terminating inwardly of the faces of said end flanges while the innermost tubular element extends out of said housing where it is flared radially outwardly over the respective faces of said end flanges.

15. A tube for a constrictable tube valve comprising at least two concentric snugly interfitted tubular elements of polytetrafluorethylene resin, the innermost tubular element being longer than the outermost tubular element and having its ends flared radially outwardly, the outer surface of the innermost tubular element having two bosses spaced apart along a longitudinal element on one side of the tubular element and two further bosses similarly spaced along a longitudinal element on the diametrically opposite side of the tubular element such that pairs of said bosses are in substantially diametral opposition, individual anchor means joined to a corresponding one of said bosses beneath all outer tubular elements, and corresponding apertures in said outer tubular elements overlying each of said bosses for providing access to the respective anchor means.

16. A valve of the type wherein a tube of flexible material is flattened to form a barrier to the flow of fluid material therethrough, comprising in combination a tube of flexible material, an actuator assembly coupled to said tube for adjustably constricting said tube transversely thereof, a rigid housing surrounding said tube and actuator assembly, said actuator assembly including a valve stem projecting therefrom and passing through an aperture in said housing, said stem being movable relative to said housing for manipulating said actuator assembly, and a grommet formed from P.T.F.E. resin surrounding said stem within said aperture for sealing said housing against gross egress of fluid in case of failure of said tube, said grommet including a series of circumferential grooves located around its outer surface for imparting resiliency thereto.

* * * * *